United States Patent [19]

Schwab et al.

[11] 4,110,232
[45] Aug. 29, 1978

[54] WATERFLOODING PROCESS EMPLOYING CATIONIC-NONIONIC COPOLYMERS

[75] Inventors: Frederick C. Schwab, Metuchen; Edward W. Sheppard, Lambertville; Catherine S. H. Chen, Berkeley Heights, all of N.J.

[73] Assignee: Mobil Oil Corporation, New York, N.Y.

[21] Appl. No.: 787,807

[22] Filed: Apr. 15, 1977

[51] Int. Cl.$^2$ ............................................. E21B 43/22
[52] U.S. Cl. .................. 252/8.55 B; 166/274; 166/275; 260/879; 260/880 R; 260/880 B
[58] Field of Search .................. 252/8.55 D; 166/275, 166/274; 260/880 B, 880 R

[56] References Cited

U.S. PATENT DOCUMENTS

| | | | |
|---|---|---|---|
| 2,802,785 | 8/1957 | Nowak et al. | 252/8.55 |
| 3,085,063 | 4/1963 | Turbak | 252/8.55 |
| 3,116,791 | 1/1964 | Sandiford et al. | 166/274 |
| 3,583,486 | 6/1971 | Stratton | 166/274 |
| 3,629,371 | 12/1971 | Winkler | 260/880 B |
| 3,744,566 | 7/1973 | Szabo et al. | 252/8.55 X |
| 3,747,676 | 7/1973 | Norton et al. | 166/275 |
| 3,945,437 | 3/1976 | Chiu et al. | 166/275 X |
| 3,948,783 | 4/1976 | Szabo et al. | 252/8.55 |
| 3,984,333 | 10/1976 | van de Kraats et al. | 252/8.55 |

OTHER PUBLICATIONS

Foster et al., Article in Journal of Petroleum Technology, vol. 25, Feb. 1973, pp. 205–210.

*Primary Examiner*—Herbert B. Guynn
*Attorney, Agent, or Firm*—Huggett C. A.; Henry L. Ehrlich

[57] ABSTRACT

This specification discloses a waterflooding process for producing oil from an oil-containing subterranean formation penetrated by an injection well and a production well. An aqueous solution of a copolymer formed of hydrophobic olefinic segments and cationic aromatic hydrophilic segments is injected into and driven through the formation in the production of oil therefrom.

6 Claims, No Drawings

WATERFLOODING PROCESS EMPLOYING CATIONIC-NONIONIC COPOLYMERS

BACKGROUND OF THE INVENTION

This invention relates to an improved waterflooding process for recovering oil from a subterranean oil-containing formation.

Waterflooding processes have long been used in the recovery of oil from oil-containing formations or oil reservoirs. Generally, in accordance with these processes, at least an injection well and a production well are provided which communicate with the reservoir and water is injected thereinto via the injection well and oil is produced therefrom via the production well. Many modifications of the basic waterflooding techniques have been employed. These modifications include the use of various chemicals and materials in the water injected into the formation to improve the recovery of oil therefrom. Surfactants have been included to reduce the interfacial tension between the injected water and the reservoir oil and thereby facilitate the recovery of the oil from the reservoir. Waterflooding processes utilizing surfactants are commonly referred to as low tension waterflooding processes. Materials and in particular polymers have been employed in the water to increase the viscosity thereof and thereby improve the efficiency of the water in displacing the oil from the reservoir.

In the carrying out of a surfactant or low tension waterflooding process, it is common practice to inject into the oil-containing formation a slug of a surfactant and follow this with a slug of thickened water to more efficiently drive the surfactant through the formation and thus improve the sweep efficiency thereof. These slugs are then usually driven through the formation by the injection of a driving fluid which is oftentimes recovered formation brines.

In U.S. Pat. No. 2,802,785 there is described a waterflooding process in which the flooding medium comprises an aqueous solution of certain surface active agents which are amphoteric in nature, i.e., which ionize in such manner that both anionic and cationic functional groups are an integral part of the molecule. In addition to their surface active properties, these agents have strong bactericidal action and do not precipitate alkaline-earth metal salts. The bactericidal surface active agents employed are the acid salts of amido-acids having the general formula:

R—CONH—(CH$_2$CH$_2$NH)$_x$—R'—COOH wherein R represents an alkyl group containing from about 10 to 22 carbon atoms, $x$ represents a numerical value from 0 to 4 inclusive, and R' represents a divalent aliphatic radical containing from 1 to 3 carbon atoms.

In a paper by W. R. Foster entitled "A Low Tension Waterflooding Process", Journal of Petroleum Technology, Vol. 25, February 1973, pp. 205-210, there is described a waterflood process wherein three slugs of water with different chemical compositions are injected into a formation, which slugs are denoted as a protective slug, a surfactant slug, and a mobility control slug. The protective slug is an aqueous solution of sodium chloride injected for the purpose of screening the low tension surfactant of the surfactant slug from the reservoir brine and base exchanging the reservoir solids — replacing magnesium and calcium with sodium ions. The surfactant slug contains the same sodium chloride content as the protective slug and contains a selected petroleum sulfonate. The primary purpose of the surfactant slug is to reduce the interfacial tension between the oil and the water to the order of 0.001 dyne/cm. The mobility control slug has considerably less sodium chloride content than the other two slugs and contains a water soluble biopolymer in a sufficient concentration to provide a locally stable mobility condition at the rear of the oil bank. The sequence of three slugs can be driven through the formation by the original reservoir brine.

In U.S. Pat. No. 3,984,333 there is described an oil recovery process in which an aqueous solution is injected into a reservoir to displace oil through the reservoir and wherein the aqueous solution is thickened with a substantially linear block copolymer containing both water soluble and water insoluble polymer chains. Suitable block copolymers comprise blocks of sulfonated polystyrene mixed with blocks of hydrogenated-polyisoprene or hydrogenated-polybutadiene.

In U.S. Pat. No. 3,085,063 there is disclosed an invention which is concerned with waterflooding and more particularly with the use of an improved class of water thickening agents wherein aldehyde solutions are used in the waterflood. The preferred water thickening agents are selected from the class of compounds comprising sulfonated polymers. Desirable polymers are polyvinyl aromatic sulfonates, as, for example, polyvinyl toluene sulfonates. Other water thickening agents may comprise sulfonated polymers as, for example, polyvinyl toluene sulfonates, polystyrene sulfonates, or substituted polystyrene sulfonates. Still other desirable water thickening agents may be secured by copolymerizing vinyl aromatics such as styrene, vinyl toluene, vinyl naphthalene, and the like, with maleic anhydride.

In U.S. Pat. No. 3,116,791 there is described a waterflooding process wherein there is employed a viscous aqueous solution of water soluble alkylene oxide polymer. The alkylene oxide polymers taught for use are the water soluble polymers of ethylene oxide, a propylene oxide or a butylene oxide. In addition to these alkylene oxide homopolymers there may also be employed copolymers of such alkylene oxides with other epoxy compounds, such as the epoxybutanes, butadiene oxide, and styrene oxides.

In U.S. Pat. No. 3,945,437 there is described a surfactant waterflooding process wherein an aqueous anionic surfactant system containing an aromatic ether polysulfonate is used for displacing oil from an oil reservoir. The aromatic ether polysulfonate improves the tolerance of the system toward salts of monovalent and multivalent cations and causes emulsions formed between the oil and the oil displacing system to be less viscous and less stable.

In U.S. Pat. No. 3,747,676 there is disclosed a waterflooding process wherein there is included in the water injected into an oil reservoir methylolated polyacrylamides formed by reacting high molecular weight polyacrylamides with aqueous solutions of formaldehyde.

In U.S. Pat. No. 3,583,486 there is described an improved waterflooding technique wherein there is included in the water injected into an oil-bearing formation an additive which has both surface active and viscosifying properties, which additive is an ethoxylated condensation product of a phenol and formaldehyde.

Various problems have been encountered in carrying out such low tension waterflooding processes. One problem involves the reactions which commonly take place between divalent ions, primarily calcium and magnesium ions, found in formation brines with the chemicals in the surfactant or mobility slugs to form insoluble precipitants which reduce the permeability of the formation. Another problem revolves around driving the surfactant slug uniformly through the formation to obtain good sweep efficiency and thus efficiently displace the oil from the formation to production wells.

SUMMARY OF THE INVENTION

This invention is directed to a method of recovering oil from an oil-containing subterranean formation that is penetrated by an injection well and a production well. An aqueous fluid is injected via the injection well into the formation to displace the oil to the production well and there is employed in at least a portion of the aqueous fluid a water soluble copolymer having hydrophobic olefinic segments and hydrophilic cationic aromatic segments.

DESCRIPTION OF THE PREFERRED EMBODIMENTS

This invention is directed to an improved waterflooding process for recovering oil from an oil-containing subterranean formation.

In accordance with this invention there is employed in at least a portion of the water injected into the formation an aqueous solution of macromolecules in the form of block or graft copolymers formed of hydrophobic segments and cationic hydrophilic segments, which copolymers are resistant to viscosity loss commonly associated with the presence of metal ions found in brine in the oil-containing formation. The macromolecular cationic hydrophilic-hydrophobic copolymers are formed to have specific architecture and low molecular weight yet yield high solution viscosity due to molecular association. Bulky quaternary groups may be positioned on the copolymer to prevent severe coiling of the copolymer chains in the presence of electrolytes found in brine and, thus, prevent the loss of solution viscosity in an electrolyte environment.

The macromolecular copolymers of this invention may be prepared in steps. The polymer skeletons are constructed from readily available monomers such as aromatic and olefinic monomers. Styrene and butadiene are commonly used aromatic and olefinic monomers and for simplicity this invention is hereafter described with reference to the use of styrene and butadiene for forming the copolymer. Block or graft copolymers are prepared by anionic polymerization techniques in various molecular architectures represented by the polymer structures I-VIII below in which S—S—S— represents a block of polystyrene and B∼B∼B represents a block of polybutadiene.

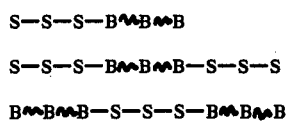

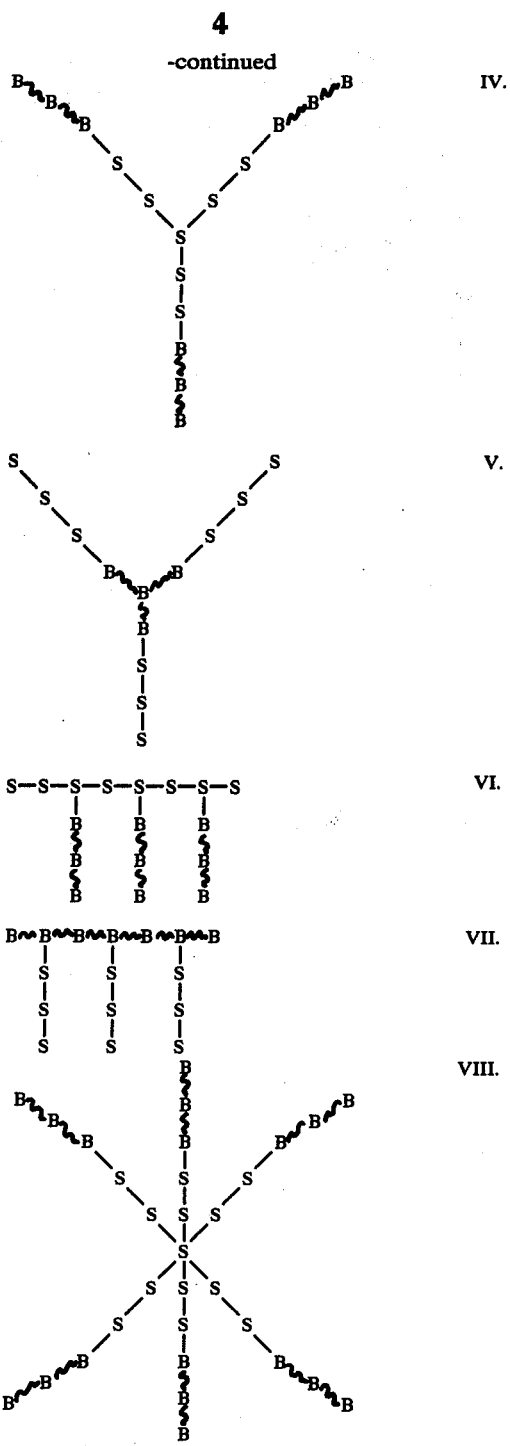

The polymer skeleton is modified to the cationic hydrophilic-hydrophobic block or graft copolymer through hydrogenation of the polybutadiene segments followed by chemical modification of the polystyrene segments to strong polyelectrolytes with cationic sites fixed onto the polymer backbone.

In the carrying out of a waterflooding process by the method of this invention there is included in at least a portion of the water injected into an oil-containing formation a brine-resistant cationic hydrophilic-hydrophobic block copolymer represented by the structural formula below:

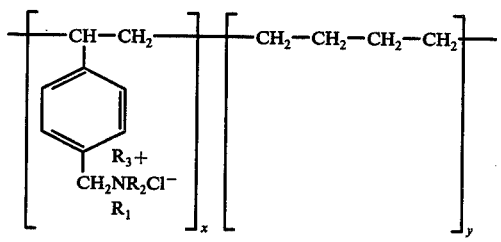

wherein $R_1$, $R_2$, and $R_3$ are alkyl groups containing 1 to 18 carbon atoms and preferably wherein at least one of $R_1$, $R_2$, and $R_3$ is an alkyl group containing 12 to 18 carbon atoms. The inclusion of at least one alkyl group containing from 12 to 18 carbon atoms provides at least one bulky group on the copolymer chains to more effectively prevent the copolymers from forming tight chains in the presence of brines containing charged materials such as sodium, calcium, and magnesium and prevents the loss of solution viscosity. This block or graft copolymer is formed having a ratio of $x:y \geqq 1$ to provide for the copolymer to be water soluble, and the copolymer is formed to have a molecular weight within the range of 50,000 to 500,000. The copolymer is included in the water injected into the oil-containing formation in a sufficient amount and concentration to thicken the water sufficiently to provide improved efficiency in driving the oil through the formation to the production well.

This invention is further illustrated by the following description of a technique for forming a brine-resistant cationic hydrophilic-hydrophobic block copolymer:

STEP I

Structures I to VIII may be prepared according to known art, where S—S—S varies from 5 to 95 percent by weight. The molecular weight of these copolymers varies from $Mw = 2 \times 10^4$ to $5 \times 10^5$.

Each structure may be characterized by molecular weight determination; molecular weight-intrinsic viscosity relationships; fractionation by GPC (gel permeation chromatography); proton; and $C_{13}$ NMR (nuclear magnetic resonance).

STEP II

Structures I to VIII may be hydrogenated in the polybutadiene segments to yield structures exemplified by (B)

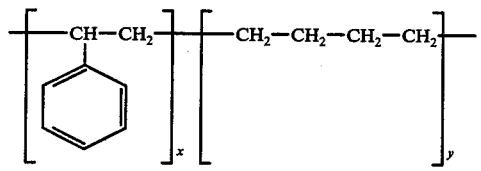

STEP III

Structure (B) may be chloromethylated using chloromethyl ether or formaldehyde and hydrogen chloride to convert the polystyrene blocks to chloromethyl polystyrene blocks as represented by (C)

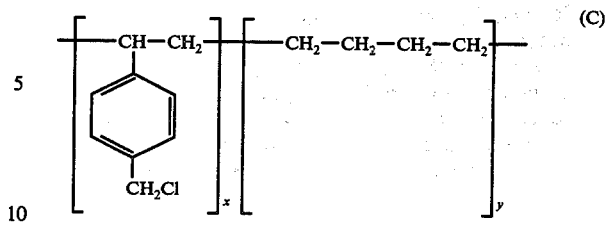

(C) may be quaterized by reacting with a tertiary amine to yield structure (D)

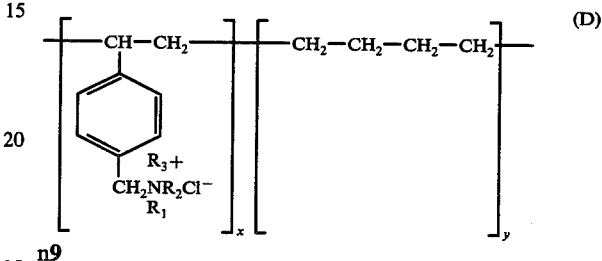

We claim:

1. In a method of recovering oil from an oil-containing subterranean formation penetrated by an injection well and a production well and wherein an aqueous fluid is injected via said injection well into said formation to displace said oil to said production well, the improvement comprising:

employing in at least a portion of said aqueous fluid injected via said injection well into said formation a water soluble copolymer having a molecular weight within the range of 50,000 to 500,000, said copolymer being employed in a sufficient amount to thicken said portion of said aqueous fluid and provide improved efficiency in displacing said oil to said production well, said water soluble copolymer being formed of hydrogenated polybutadiene segments and polystyrene segments chemically modified to strong polyelectrolytes with cationic sites fixed onto the polymer backbone, said polystyrene segments having been first chloromethylated by reacting with chloromethyl ether or formaldehyde and hydrogen chloride and then quaterized by reacting with a tertiary amine to form strong polyelectrolytes with cationic sites fixed onto the polymer backbone, said copolymer having the following structural formula:

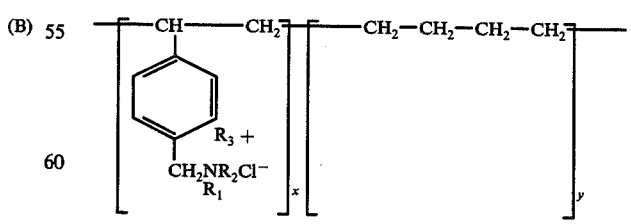

wherein:

$R_1$, $R_2$, and $R_3$ are alkyl groups containing 1 to 18 carbon atoms, and $x$ to $y$ is a ratio that is equal to or greater than about 1.

2. The method of claim 1 wherein at least one of $R_1$, $R_2$, and $R_3$ is an alkyl group containing 12 to 15 carbon atoms.

3. The method of claim 2 wherein the copolymer is a block or graft copolymer having a molecular structure represented by any of the following structures, where S—S—S represents a block of polystyrene and B~B~B represents a block of polybutadiene:

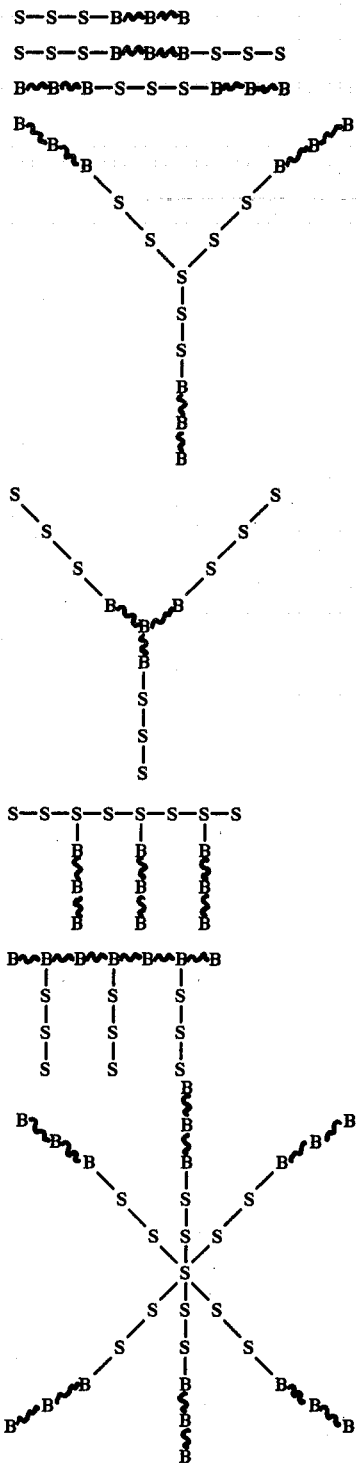

4. In a method of recovering oil from an oil-containing subterranean formation penetrated by an injection well and a production well and wherein an aqueous fluid is injected via said injection well into said formation to displace said oil to said production well, the improvement comprising:

employing in at least a portion of said aqueous fluid injected into said formation a water soluble copolymer having a molecular weight within the range of 50,000 to 500,000, said copolymer being employed in a sufficient amount to thicken said portion of said aqueous fluid and provide improved efficiency in displacing said oil to said production well, said copolymer having the formula

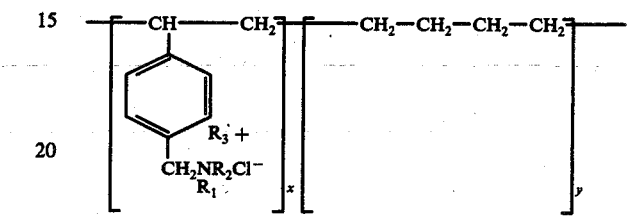

wherein:
$R_1$, $R_2$, and $R_3$ are alkyl groups containing 1 to 18 carbon atoms, and
$x$ to $y$ is a ratio equal to or greater than about 1.

5. The method of claim 4 wherein at least one of $R_1$, $R_2$, and $R_3$ is an alkyl group containing 12 to 15 carbon atoms.

6. The method of claim 5 wherein said copolymer is a block or graft copolymer having a molecular structure represented by any of the following structures, where S—S—S represents polystyrene blocks and B~B~B represents polybutadiene blocks:

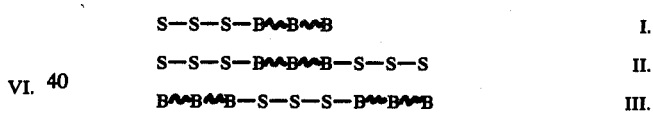

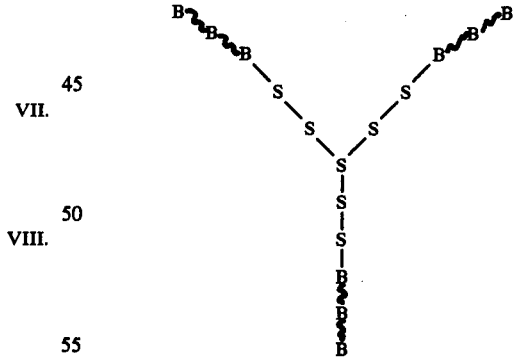

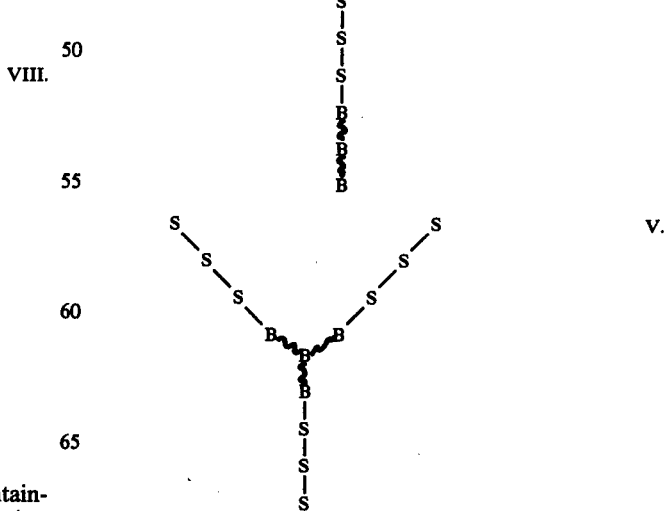

-continued
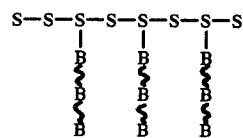
VI.
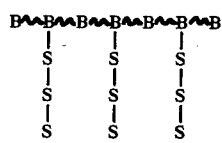
VII.
-continued
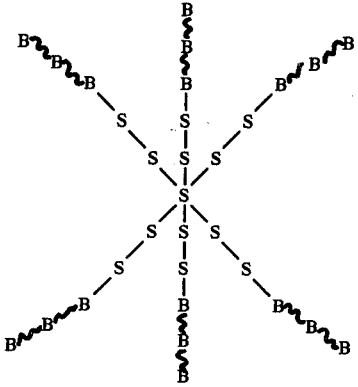
VIII.
* * * * *